Nov. 14, 1933.   S. S. CRAMER ET AL   1,934,842
VARIABLE ELECTROSTATIC CONDENSER
Filed Dec. 28, 1927   2 Sheets-Sheet 1
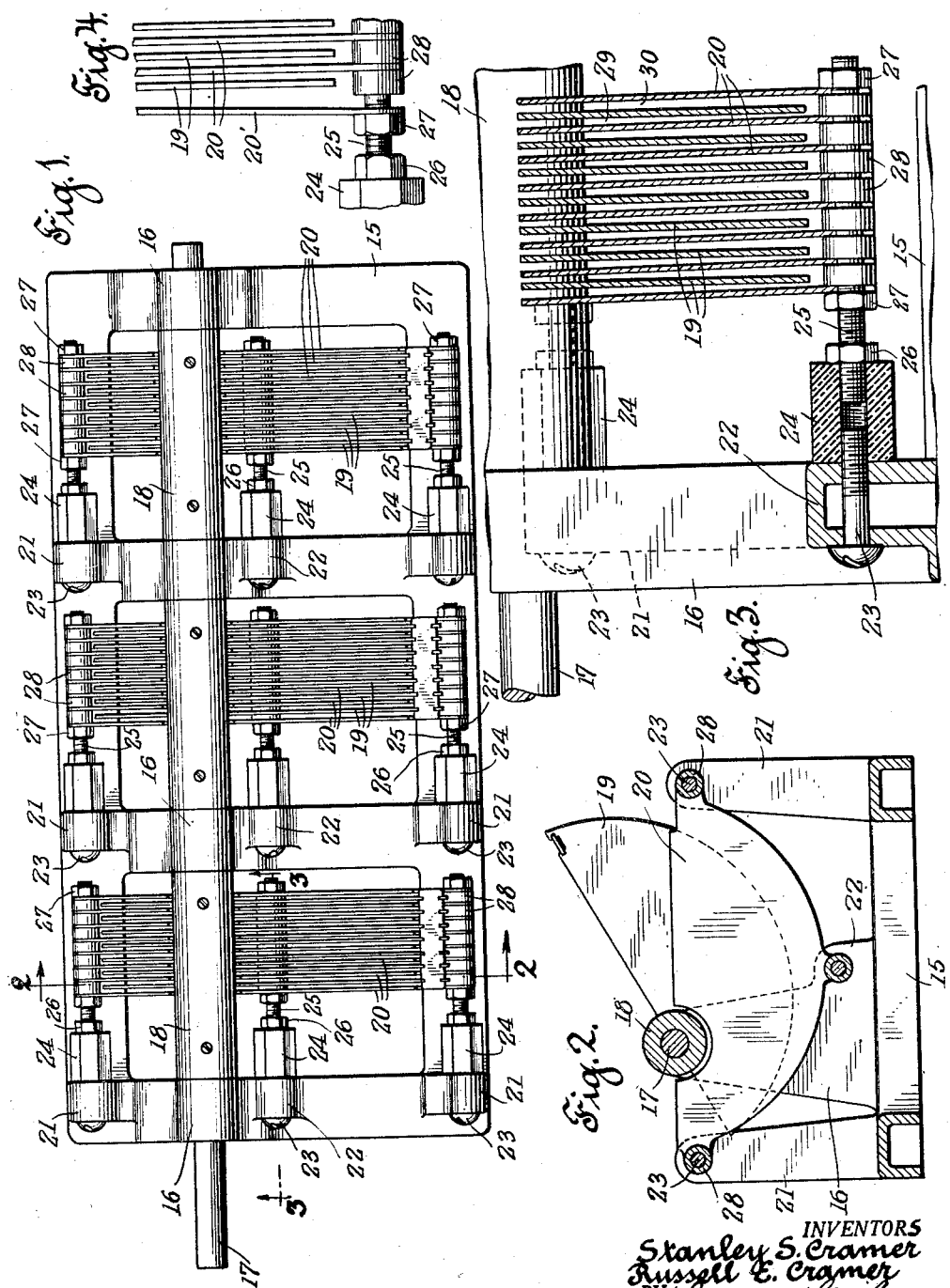
INVENTORS
Stanley S. Cramer
Russell E. Cramer
BY
ATTORNEY Nov. 14, 1933.   S. S. CRAMER ET AL   1,934,842
VARIABLE ELECTROSTATIC CONDENSER
Filed Dec. 28, 1927   2 Sheets-Sheet 2
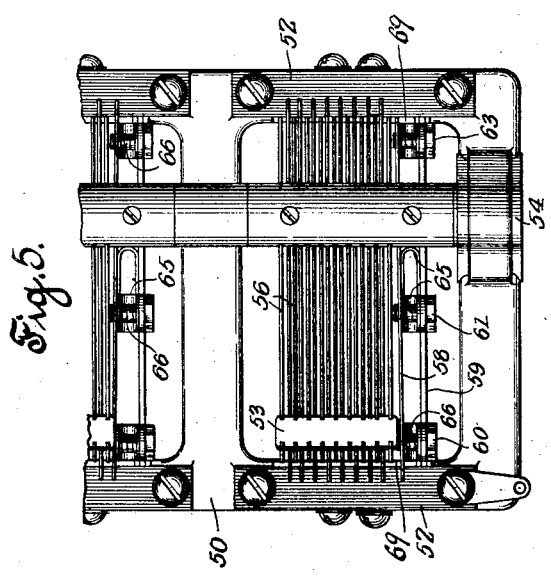
INVENTORS
Stanley S. Cramer
Russell E. Cramer
BY Frank C. Fischer
ATTORNEY Patented Nov. 14, 1933

1,934,842

UNITED STATES PATENT OFFICE

1,934,842

VARIABLE ELECTROSTATIC CONDENSER

Stanley S. Cramer, Haddon Heights, and Russell E. Cramer, Audubon, N. J.

Application December 28, 1927
Serial No. 243,044

2 Claims. (Cl. 175—41.5)

This invention relates to electrostatic condensers as used in radio communication, and is more particularly directed to such condensers by which the electrostatic capacity of several interdependent electrical circuits may be regulated to cause consonantal reactance, when such a system is applied to a radio set.

The present invention has as one of its purposes the addition of certain members in its structural arrangement to cause a capacity change rate, as by changing the eccentricity of the capacity curve in each individual circuit, by utilizing such structural arrangements best calculated to both support in clamped and set up arrangement a plurality of stator stacks intended to be shifted more or less in parallellism, or at angular differences, to a series of shiftable metallic sheets constituting rotor stacks, which are substantially confined in parallellism.

In the common type of variable electrostatic condensers now generally used in radio circuits the stator plates and the rotor plates are rigidly held in uniform spaced relation. In this type of condenser the rate of change of capacity per degree of rotation of the rotor plates may vary, and such variance may be represented by a definite fixed curved plotted with the degree of rotation as abscissa and the rate of change of capacity as ordinates.

Also with the common type of variable condensers the stator and rotor plate are made to prescribed dimensions calculated to give a predetermined curve for the rate of change of capacity, but in the manufacture of such rotor and stator plates there is more or less warping, which of course, varies the length of the air gap between the rotor and stator plates with the result that the rate of change of capacity curve for the manufactured condenser will not coincide with the standard predetermined curve.

It is an object of our invention to provide a variable electrostatic condenser which may be adjusted so that the rate of change of capacity curve may be varied to meet various requirements and to compensate for warping and other imperfections in manufacturing. These results are accomplished by providing a series of stator plates which may be shifted as a unit so that they will be in angular relation to the rotor plates and accordingly the length of the air gap between the rotor and stator plates will be varied; or we may provide a series of rotor and stator plates in parallel relation to each other with one of the stator plates being so mounted that it may be flexed at a plurality of points to vary the air gap between that stator plate and the adjacent rotor plate.

Another object of this invention is to provide a novel and effective means for separating the capacity increments of a variable electrical condenser to create a peak resonance in the tuning circuit.

A further feature of the invention is to associate with one of the self-contained elements, means to substantially separate the tuning range of the condenser into two parts, it being well known that the lower range of the ordinary condensers do not have enough capacity to bring the stations in at an early setting of the dial.

A still further object of the invention is in providing means by which the capacity of the condenser over its working range may be properly evaluated so that the curve may be reflexed at prescribed intervals as distinguished from a straight line capacity curve.

A further purpose of the invention is to render it possible to modify the station settings or to spread them out in a manner best suited to the territory in which the receiving set is used as it is a well known fact that various locations have certain critical electrical conditions tending to influence the tuning factor more or less.

A further object is to provide a condenser which may be conveniently calibrated with a standard condenser by the condenser manufacturer so that the condensers may be supplied with a known and standard capacity to builders of radio receiving sets.

A further object is to provide a condenser of standard capacity which may be adjusted by the builder of radio receiving sets to conform with the inductances used in the receiving sets so that a perfectly balanced receiving circuit may be obtained.

Figure 1 is a top plan view of the preferred form of an embodiment of a condenser made in accordance with the invention.

Figure 2 is a transverse sectional view taken on line 2—2 of Figure 1.

Figure 3 is a fragmentary longitudinal sectional view taken on line 3—3 of Figure 1, drawn to an enlarged scale.

Figure 4 is an enlarged view of details shown in Figure 3.

Figure 5 is a plan view of another form of the invention.

Figure 6 is an end view of the form shown in Figure 5.

Figure 7 is a detail view of a modified form,

Figure 8 is an end view of the modified form of Figure 7.

In the form of the condenser, as shown in Figures 1 to 3, a cast base 15 is used, the same being an elongated rectangular grid in plan, its cross bar elements carrying raised supports 16 in which are revolubly mounted a rotor shaft 17 actuated by the usual knob and dial, not shown.

Attached to the shaft 17 are sleeves 18 held by screws or like securing means, the ends of these sleeves making contact with the inner adjacent ends of the supports so that end motion is prevented.

The sleeves are slotted transversely over a portion of their lengths, the slots being uniformly spaced, and rigidly fixed in these slots are a series of rotor plates 19 of any preferred contour, all of the several plates in any series being in electrical engagement.

Interleaved with these plates are a series of corresponding stator plates 20, recessed to clear the sleeves 18, the plates being held in insulated relation to the rotor plates in the following manner.

Raised brackets 21 at the sides of the base or frame 10, similar but lower brackets 22 at the center, are drilled to receive clamp screws 23, which passing through, enter internally threaded insulating blocks 24, preferably polygonal to receive a wrench, these blocks being normally drawn tightly against the inner faces of the brackets.

Threaded into the opposite end of the blocks 24 are rods 25, held when in adjustment by clamp nuts 26. Also engaged upon the rods are similar nuts 27 having between them one of the unitary series of stator plates 20, the plates being uniformly spaced by spacing collars 28.

Thus it will be seen that the stator plate series may be firmly secured on the rods to constitute a unit and the unit adjusted laterally in the frame with reference to the rotor plate units.

Furthermore it is readily possible to vary the length of the air gaps 29 and 30 by shifting the series of stator plates as a unit so that they will not be parallel with, but will be positioned at an angle to the rotor plates as indicated in the enlarged view shown in Figure 3.

Such angular adjustment is accomplished by springing the stator plates uniformly, as by slackening the clamp nuts 26, and screws 23, and turning the insulators 24 at the front, rear or bottom, to secure the desired results and thereafter tightening the adjusting elements to retain the series in adjustment.

In Figure 4 another method of varying the rate of change of capacity of the type of condenser shown in Figures 1, 2 and 3 consists in holding the stator and rotor plates 20 and 19 respectively, in parallel spaced relation except the outermost stator plate 25 which may be flexed in a plurality of points to vary the air gap between plate 25 and the adjacent rotor plate. Inasmuch as this plate 25 is mounted in three points all that is necessary to flex it is to loosen one of the nuts 27 and the plate will spring outwardly as clearly shown in Figure 4.

In Figure 5 another form of adjustable condenser is disclosed having a base 50 upon which are projections 51 so designed to permit the mounting of the insulations 52. Also integral at the base 50 is an upstanding arm 54 which serves as a support for the shaft 55 upon which are mounted the rotor plates 56 which are held in uniform spaced relation by means of the notched straddle straps 53 which also electrically connect the rotor plates.

The stator plates are rigidly held in uniform spaced relation in the notched straddle plates 69 mounted on the base 50, but one of the stator plates is loosely mounted upon the frame 59 the latter being rigidly held in notches in the straddle plate 69.

This loosely mounted stator plate 58 is connected to the frame 59 by means of the screw 66 and the distance between the frame 59 and the plate 58 may be varied by rotating the nut 61 integral with the screw 66, the latter engaging threaded apertures in the stator plate. A bent leaf spring 65 as shown enables the resilient adjustment of the distance between the frame and the stator plate 58. As will be seen the variance in the distance between the frame 59 and the stator plate 58 will accordingly vary the air gap between the stator plate 58 and the adjacent rotor plate which will result in a variation in the rate of change of capacity per degree of rotation of the rotor plates.

As will be shown in Figure 6, four adjusting nuts 60, 61, 63 and 64 are provided which enable the flexing of the plate 58 at four points consequently producing a wide range of adjustments.

In operation should it be desired to increase the rate of change of capacity per degree of rotation during the first 90 degrees of rotation the nut 60 is rotated to loosen the screw 66. This adjustment will cause the plate 58 to be forced by the spring 66 in a position nearer to the adjacent rotor plate which decreases the air gap between the two plates and consequently increases the capacity.

Similarly if it is desired to increase or decrease the capacity per degree of rotation at any point in the path of rotation of the rotor plate the corresponding nuts 61, 63, 64 and 60 are either loosened or tightened to adjust the plate 58 to produce the desired rate of change in capacity.

It will be seen from the above description that we have provided a variable condenser which is especially adptable for single dial control radio receiving sets in which the condensers are mechanically connected to a single control. With our condenser the tuning plates may be adjusted to maintain the same rate of change of the electrostatic capacity per degree of rotation of the rotor for each condenser, also the tuning plates may be adjusted to compensate for warping and other imperfections during the process of manufacture.

We claim:

1. In an electrical condenser comprising a fixed group of plate elements and a movable group of plate elements, a plate associated with at least one of said groups of elements, means for resiliently mounting said plate and screws cooperating with said resilient means for adjusting said plate at a plurality of points as and for the purpose described.

2. In an electrical condenser comprising a group of stator plates and a group of rotor plates, a plate associated with the stator plates, a frame member parallel with and spaced from said plate, a plurality of screws threadedly connected with said plate and passing through the frame member, said screws having heads engaging the frame member to limit movement of the screws in one direction, and a plurality of bowed flat springs engaging said plate and said frame member, each of said screws passing through one of the bowed flat springs.

STANLEY S. CRAMER.
RUSSELL E. CRAMER.